(12) United States Patent
Shi et al.

(10) Patent No.: US 10,863,405 B2
(45) Date of Patent: Dec. 8, 2020

(54) METHOD AND APPARATUS FOR ACCESS POINT SELECTION

(71) Applicant: Telefonaktiebolaget LM Ericsson (publ), Stockholm (SE)

(72) Inventors: Cong Shi, Beijing (CN); Jinhua Liu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/324,216

(22) PCT Filed: Jul. 9, 2014

(86) PCT No.: PCT/CN2014/081912
§ 371 (c)(1),
(2) Date: Jan. 5, 2017

(87) PCT Pub. No.: WO2016/004596
PCT Pub. Date: Jan. 14, 2016

(65) Prior Publication Data
US 2017/0164260 A1 Jun. 8, 2017

(51) Int. Cl.
*H04W 36/30* (2009.01)
*H04W 36/00* (2009.01)
(Continued)

(52) U.S. Cl.
CPC .......... *H04W 36/30* (2013.01); *H04B 17/318* (2015.01); *H04W 36/0061* (2013.01);
(Continued)

(58) Field of Classification Search
CPC ..... H04W 24/08; H04W 36/08; H04W 36/30; H04W 24/10; H04W 28/18;
(Continued)

(56) References Cited

U.S. PATENT DOCUMENTS

2001/0046879 A1\* 11/2001 Schramm .............. H04W 36/30
455/525
2006/0276189 A1\* 12/2006 Kiernan ................ H04W 36/14
455/436
(Continued)

FOREIGN PATENT DOCUMENTS

CN 102714787 3/2010
CN 102045797 12/2010
(Continued)

OTHER PUBLICATIONS

Extended European Search Report for Application No./Patent No. 14897050.2-1854 / 3167656 PCT/CN2014081912—dated Dec. 20, 2017.
(Continued)

*Primary Examiner* — George Eng
*Assistant Examiner* — Umair Ahsan
(74) *Attorney, Agent, or Firm* — Patent Portfolio Builders, PLLC

(57) ABSTRACT

Embodiments of the present disclosure relate to access point (AP) selection. According to one embodiment, the serving AP receives from the terminal device a measurement report including one or more measurement parameters for a plurality of neighbor AP devices and the serving AP device and selects from the plurality of neighbor AP devices one or more candidate target AP devices based on the measurement report received from the terminal device. Then, the serving AP can obtain evaluated capability levels from the selected one or more candidate target AP devices and determine from the selected one or more candidate target AP devices a best candidate target AP device with the highest evaluated capability level as a target AP device.

12 Claims, 6 Drawing Sheets

(51) Int. Cl.
*H04B 17/318* (2015.01)
*H04W 36/08* (2009.01)

(52) U.S. Cl.
CPC . *H04W 36/0083* (2013.01); *H04W 36/00835* (2018.08); *H04W 36/08* (2013.01); *H04W 36/0058* (2018.08)

(58) Field of Classification Search
CPC ......... H04W 36/0061; H04W 36/0083; H04W 8/24; H04B 17/318
See application file for complete search history.

(56) References Cited

U.S. PATENT DOCUMENTS

| | | | | |
|---|---|---|---|---|
| 2010/0124928 | A1* | 5/2010 | Ergen | H04W 36/30 455/436 |
| 2011/0201336 | A1* | 8/2011 | Garrett | H04W 36/0066 455/436 |
| 2011/0237254 | A1* | 9/2011 | Lee | H04N 21/234 455/435.2 |
| 2012/0120922 | A1* | 5/2012 | Huang | H04W 36/24 370/332 |
| 2013/0155847 | A1* | 6/2013 | Li | H04W 24/04 370/225 |
| 2013/0260762 | A1* | 10/2013 | Tomita | H04W 36/30 455/436 |
| 2015/0230168 | A1* | 8/2015 | Sawai | H04W 48/20 370/254 |
| 2015/0257024 | A1* | 9/2015 | Baid | H04W 24/10 370/338 |
| 2017/0127456 | A1* | 5/2017 | Tsuda | H04W 88/04 |

FOREIGN PATENT DOCUMENTS

| | | |
|---|---|---|
| CN | 103209447 | 3/2013 |
| WO | 2006 107701 A2 | 10/2006 |
| WO | 2006 107701 A3 | 10/2006 |
| WO | WO 2009/157678 | 12/2009 |

OTHER PUBLICATIONS

PCT Notification of Transmittal of the International Search Report and the Written Opinion of the International Searching Authority, or the Declaration for International application No. PCT/CN2014/081912—dated Mar. 24, 2015.
Communication Pursuant to Article 94(3) EPC for Application No. 14 897 050.2-1214—dated May 17, 2019.
Office Action issued in corresponding EP Application No. 14897050.2 dated May 17, 2019, 05 Pages.
Office Action issued in corresponding EP Application No. 14897050.2 dated Jan. 2, 2020, 05 Pages.

* cited by examiner providing the serving AP device with an evaluated capability level indicative of the capability of user experience to be provided for the terminal device — S410

METHOD AND APPARATUS FOR ACCESS POINT SELECTION

PRIORITY

This non-provisional application is a U.S. National Stage Filing under 35 U.S.C. § 371 of International Patent Application Ser. No. PCT/CN2014/081912 filed Jul. 9, 2014, and entitled "Method and Apparatus for Access Point Selection."

TECHNICAL FIELD

The embodiments of the present disclosure generally relate to wireless communication, particularly to methods and apparatuses for access point selection in a radio network with an ultra frequency bands.

DESCRIPTION OF THE RELATED ART

Ultra-dense networks (UDN) are wireless networks envisioned to provide ubiquitous mobile broadband with access-node densities considerably higher than the densest cellular networks of today, i.e. the distances between Access Point (AP) are from a few meters in indoor deployments up to around 50 m in outdoor deployment. A typical deployment for an UDN is in highly populated areas such as hot spots, office building, or downtown area at cities, where there are demands of high data rate service. The UDN may be designed to utilize an ultra frequency bands at 60 GHz with a wide bandwidth instead of low frequency bands with a clear bandwidth limit, in order to reach an even higher data rate. Therefore, a UDN is also referred as to a "Millimeter Wave (mmW) network".

Due to weak scattering and diffraction at high frequency compared to low frequency, and the ultra-density deployment of the UDN, there are following characteristics of the UDN network, Wireless backhaul: since the UDN is deployed in ultra-density way, the wired backhaul for access point (AP) to core network is not practical due to economical and flexible deployment requirement. Wireless backhaul is capacity limited; therefore performance of the user equipment (UE) is impacted by the wireless backhaul capacity, even though the link quality is good enough.

Each access point in the UDN could not fully cover an area due to its line of sight (LOS) requirement; the access points need to cooperate to complement each other so as to form a full coverage. Therefore, in the UDN, there is a higher handover rate than conventional wireless/mobile networks operating at low frequencies. UE may have more candidate target APs, when handover is needed.

Omni-transmission of pilot, beacon and/or control channel is not practical in the UDN, as it may result in a small coverage due to an mmW frequency. Therefore, it is necessary in the UDN that pilot and control channel transmission is performed by high-gain beam transmission using some kind of beam sweeping way.

In a conventional handover procedure, such as that specified in the Third Generation Partnership Project (3GPP) Long Term Evolution (LTE)standards, such as 3GPP TS 36.331 Version 11.8.0, the AP selection and handover triggering are usually decided based on signal strength measured by the UE. However, for UDN, as described above, there may be more factors that could impact the UE performance in addition to the signal strength. In such case, AP selection and handover triggering mainly based on the signal strength measured by the UE may not naturally/usually result in an optimized user experience as well as optimized network performance.

SUMMARY OF THE DISCLOSURE

Therefore, there is a need to provide a solution of AP selection that facilitates to take into account more factors impacting UE's performance in a handover procedure, so as to accommodate to the characteristics of UDN.

In order to solve at least one of the above problems in the prior art, one or more method and apparatus embodiments according to the present disclosure aim to provide a solution for AP selection in a UDN.

Various aspects of examples of the disclosure are set out in the claims.

According to an aspect of the present disclosure, an embodiment of the present disclosure provides a method for operating an access point device in a radio communication system, wherein the access point device is currently connected with a terminal device and serving as the serving access point device. The method comprises receiving from the terminal device a measurement report including one or more measurement parameters for a plurality of neighbor access point devices and the serving access point device; selecting from the plurality of neighbor access point devices one or more candidate target access point devices based on the measurement report received from the terminal device; obtaining evaluated capability levels from the selected one or more candidate target access point devices, each of evaluated capability levels being indicative of the capability of user experience to be provided by a respective candidate target access point device for the terminal device; and determining from the selected one or more candidate target access point devices a best candidate target access point device with the highest evaluated capability level as a target access point device.

According to another aspect of the present disclosure, an embodiment of the present disclosure provides a method for operating an access point device in a radio communication system, wherein the access point device is neighboring to a serving access point device of a terminal device. The method comprises providing the serving access point device with an evaluated capability level indicative of the capability of user experience to be provided for the terminal device.

According to other aspects of the present disclosure, an embodiment of the present disclosure also provides an access point device in a radio communication system. The access point device comprises a receiving unit configured to receive from a terminal device a measurement report including one or more measurement parameters for a plurality of neighbor access point devices and the access point device, wherein the access point device is currently connected with the terminal device and serving as the serving access point device of the terminal device; a selecting unit configured to select from the plurality of neighbor access point devices one or more candidate target access point devices based on the measurement report received from the terminal device; an obtaining unit configured to obtain evaluated capability levels from the selected one or more candidate target access point devices, each of evaluated capability levels being indicative of the capability of user experience to be provided by a respective candidate target access point device for the terminal device; and a determining unit configured to determine from the selected one or more candidate target access point devices a best candidate target access point device with the highest evaluated capability level as a target access point device.

According to other aspects of the present disclosure, an embodiment of the present disclosure also provides an access point device in a radio communication system, wherein the access point device is neighboring to a serving access point device of a terminal device. The access point device comprises a providing unit configured to provide the serving access point device with an evaluated capability level indicative of the capability of user experience to be provided for the terminal device.

According to other aspects of the present disclosure, an embodiment of the present disclosure also provides an apparatus for operating an access point device in a radio communication system, wherein the access point device is currently connected with a terminal device and serving as the serving access point device. The apparatus comprises means for receiving from the terminal device a measurement report including one or more measurement parameters for a plurality of neighbor access point devices and the serving access point device; means for selecting from the plurality of neighbor access point devices one or more candidate target access point devices based on the measurement report received from the terminal device; means for obtaining evaluated capability levels from the selected one or more candidate target access point devices, each of evaluated capability levels being indicative of the capability of user experience to be provided by a respective candidate target access point device for the terminal device; and means for determining from the selected one or more candidate target access point devices a best candidate target access point device with the highest evaluated capability level as a target access point device.

According to other aspects of the present disclosure, an embodiment of the present disclosure also provides an apparatus for operating an access point device in a radio communication system, wherein the access point device is neighboring to a serving access point device of a terminal device. The apparatus comprises means for providing the serving access point device with an evaluated capability level indicative of the capability of user experience to be provided for the terminal device.

According to other aspects of the present disclosure, an embodiment of the present disclosure also provides an access point device in a radio communication system comprising one or more processors; and one or more memories including computer program code, the one or more memories and the computer program code configured to, with the one or more processors, cause the access point device to perform: receiving, from a terminal device, a measurement report including one or more measurement parameters for a plurality of neighbor access point devices and the access point device, wherein the access point device is currently connected with the terminal device and serving as the serving access point device of the terminal device; selecting, from the plurality of neighbor access point devices, one or more candidate target access point devices based on the measurement report received from the terminal device; obtaining evaluated capability levels from the selected one or more candidate target access point devices, each of evaluated capability levels being indicative of the capability of user experience to be provided by a respective candidate target access point device for the terminal device; and determining, from the selected one or more candidate target access point devices, a best candidate target access point device with the highest evaluated capability level as a target access point device.

According to other aspects of the present disclosure, an embodiment of the present disclosure also provides an access point device in a radio communication system comprising one or more processors; and one or more memories including computer program code, the one or more memories and the computer program code configured to, with the one or more processors, cause the access point device to perform: providing the serving access point device with an evaluated capability level indicative of the capability of user experience to be provided for the terminal device, wherein the access point device is neighboring to the serving access point device of a terminal device.

According to other aspects of the present disclosure, an embodiment of the present disclosure also provides an access point device in a radio communication system comprising processing means adapted to: receive from a terminal device a measurement report including one or more measurement parameters for a plurality of neighbor access point devices and the access point device, wherein the access point device is currently connected with the terminal device and serving as the serving access point device of the terminal device; select from the plurality of neighbor access point devices one or more candidate target access point devices based on the measurement report received from the terminal device; obtain evaluated capability levels from the selected one or more candidate target access point devices, each of evaluated capability levels being indicative of the capability of user experience to be provided by a respective candidate target access point device for the terminal device; and determine whether to hand over the terminal device from the serving access point device to one of the candidate target access point devices based on the evaluated capability levels obtained from the one or more candidate target access point devices.

According to other aspects of the present disclosure, an embodiment of the present disclosure also provides an access point device in a radio communication system comprising processing means adapted to provide the serving access point device with an evaluated capability level indicative of the capability of user experience to be provided for the terminal device, wherein the access point device is neighboring to the serving access point device of a terminal device.

According to one or more embodiments of the present disclosure, the serving access point device is allowed to obtain the information of evaluated capability levels from the candidate target access point devices that are selected based on the terminal device's measurement report. As a result, the capability of user experience to be provided by a respective candidate target access point device for the terminal device can be considered, when the serving access point device makes the decision of handing over the terminal device to the target access point device.

BRIEF DESCRIPTION OF THE DRAWINGS

Inventive features regarded as the characteristics of the present disclosure are set forth in the appended claims.

However, the present disclosure, its implementation mode, other objectives, features and advantages will be better understood through reading the following detailed description on the exemplary embodiments with reference to the accompanying drawings, where in the drawings:

FIG. 4 schematically illustrates an exemplary flow diagram of the method for operating a neighbor AP device according to one or more embodiments of the present disclosure;

DETAILED DESCRIPTION OF THE PREFERRED EMBODIMENT

Hereinafter, embodiments of the present disclosure will be described with reference to the accompanying drawings. In the following description, many specific details are illustrated so as to understand the present disclosure more comprehensively. However, it is apparent to the skilled in the art that implementation of the present disclosure may not have these details. Additionally, it should be understood that the present disclosure is not limited to the particular embodiments as introduced here. On the contrary, any arbitrary combination of the following features and elements may be considered to implement and practice the present disclosure, regardless of whether they involve different embodiments. Thus, the following aspects, features, embodiments and advantages are only for illustrative purposes, and should not be understood as elements or limitations of the appended claims, unless otherwise explicitly specified in the claims.

Figure 1:
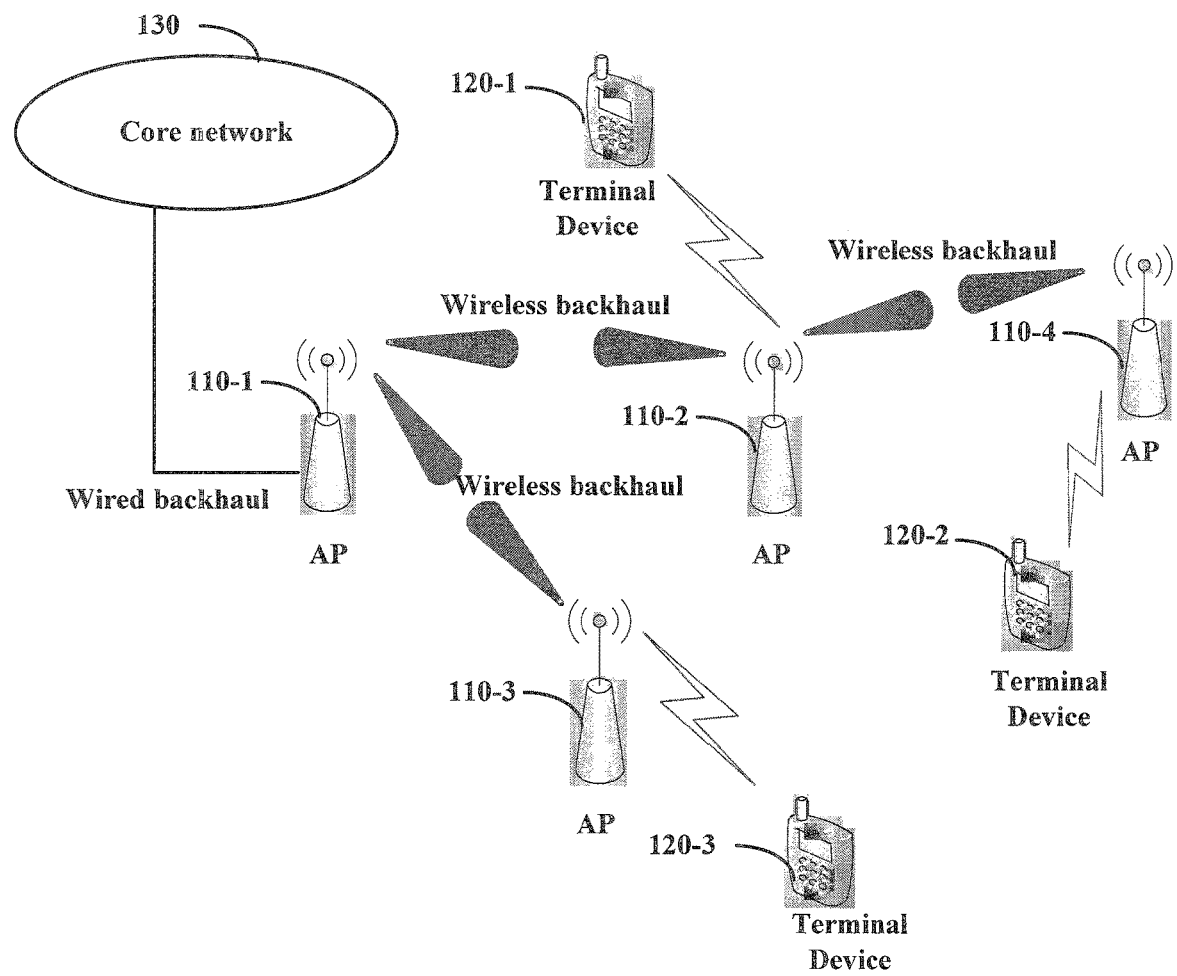
FIG. 1 schematically illustrates a radio communication system in which one or more embodiments of the present disclosure may be implemented.

FIG. 1 schematically illustrates a radio communication system 100 in which one or more embodiments of the present disclosure may be implemented.

As an example, the radio communication system 100 adopts UDN architecture, which comprises access point devices (also referred as to access nodes), as exemplarily denoted by reference numerals 110-1, 110-2, 110-3, 110-4 and terminal devices (also referred as to User Equipment) as exemplarily denoted by reference numerals 120-1, 120-2, 120-3. The AP devices 110-1, 110-2, 110-3, 110-4 perform scheduling and baseband processing and may terminate radio interface(s) thereof (including physical, medium access, and link layers). The distances between the AP devices 110-1, 110-2, 110-3 are relatively short, for example, from a few meters in indoor deployments up to around 50 m in outdoor deployment. The AP devices can directly be connected to fixed transport backhaul or can be wirelessly backhauled by other AP devices. In this example, the AP device 110-1 has a wired transport backhaul to the core network 130, whereas the AP devices 110-2, 110-3 and 110-4 have wireless channels serving as backhauls. Wireless backhauls for different AP devices 110-2, 110-3 and 110-4 may have different hops, as they may need other AP device(s) serving as backhaul relay node(s). The AP devices 110-2 and 110-3 adopt one-hop wireless backhaul link with a relay node AP device 110-1, whereas the AP device 110-4 adopts two-hop wireless backhaul link with two relay nodes AP devices 110-2 and 110-1. The skilled person in the art may appreciate that the capacity of a wireless backhaul link may be impacted by the number of hops and the quality of wireless links between the relay nodes.

All these physical nodes in the radio communication system 100 are aided by several logical functional entities (not shown in FIG. 1) responsible for managing various aspects of the radio communication system 100 including transport and access resource coordination and mobility. These functional entities may in some scenarios be implemented in the AP devices but can also be implemented in local servers or in the cloud.

According to the foregoing description, there may be more factors that could impact the terminal device performance in the radio communication system 100 in addition to the signal strength and traffic load of the serving cell, for instance, backhaul capacity, channel availability, high gain beamforming. From the perspective of optimizing user experience as well as optimizing network performance, it is not enough to select target AP to perform the handover procedure mainly based on the signal strength by the UE. New measurements and/or schemes shall be developed to determine the target AP device, which can provide better user experience than the original serving AP and other candidate AP devices for a terminal device.

In some scenarios, it may be assumed that the AP devices 110-1, 110-2, 110-3 in the radio communication system 100 would be deployed in ultra-high density, an AP may have large overlapped coverage with clearly more neighboring APs even compared to today's homogeneous network of LTE. This means the terminal devices 120-1, 120-2, 120-3 may usually have several candidate AP devices for determining the final target AP during the handover procedure.

The skilled person in the art may appreciate that the UDN such as the radio communication system 100 is only a non-limiting exemplary system in which one or more embodiments may be implemented. Some embodiments of the present disclosure may also be implemented in other suitable radio communication system than the UDN, although the technical problem addressed by the present disclosure and the embodiments thereof are set forth in the context of UDN. In principle, various embodiments of the present disclosure may be applied for any system with very small cells at low or high frequency.

With references to FIGS. 2 to 7, various embodiments of the present disclosure will be set forth in detail.

Figure 2:
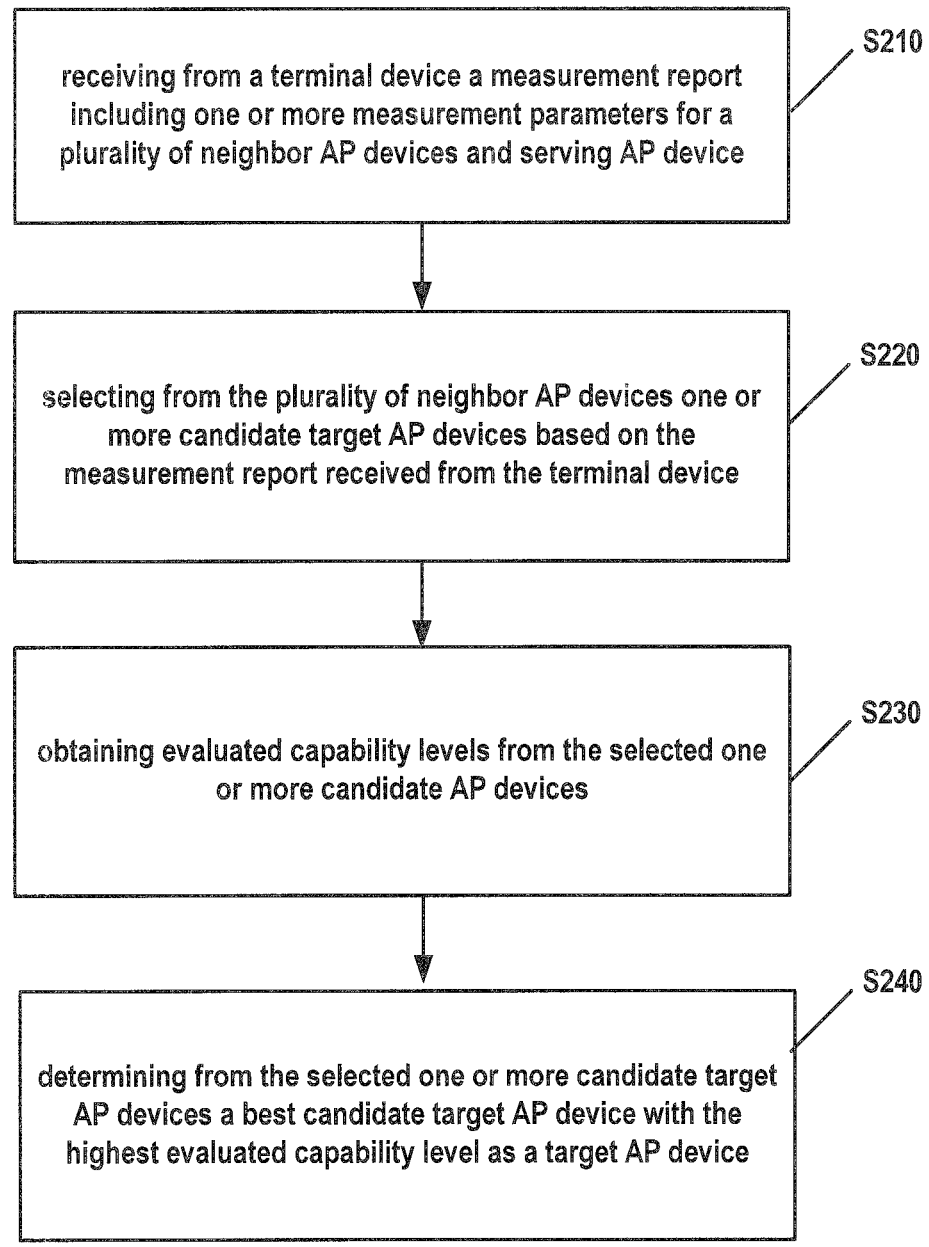
FIG. 2 schematically illustrates an exemplary flow diagram of the method for operating a serving AP device according to one or more embodiments of the present disclosure.

FIG. 2 schematically illustrates an exemplary flow diagram of the method 200 for operating an access point device in a radio communication system according to one or more embodiments of the present disclosure.

As shown in FIG. 2, in step S210, an AP device receives from a terminal device a measurement report including one or more measurement parameters for a plurality of neighbor AP devices and said serving access point device. The AP device is currently connected with the terminal device and serving as the serving access point device.

For example, in the radio communication system 100, the terminal device 120-2 is currently connected with the AP device 110-4, which acts as its serving AP device. In addition to the serving AP device 110-4, the terminal device 120-2 may also receive reference signals from the neighbor AP devices 110-1, 110-2 and 110-3 so as to produce and send to the serving AP device 110-4 a measurement report including one or more measurement parameters for those AP devices. Such measurement and report can be either done by the terminal device 120-2 periodically or triggered by some predetermined events.

According to one or more embodiments of the present invention, the measurement parameters included in the measurement report may comprise two major categories as below:
- at least one parameter indicating signal strength received from a neighbor AP device of the plurality of neighbor AP devices; and
- at least one parameter indicating the identification of the neighbor AP device.

For example, the one or more parameters representing received signal strength may be selected from the group including signal strength level, single-to noise ratio (SNR), signal-to-interference-plus-noise ratio (SINR). The one or more parameter representing the identification of the neighbor AP device signal may be access point device identification (ID) and/or best beacon ID (also referred to sector ID) and optionally, signal angle of arrival (AoA) and/or interference angle of arrival (AoA) with respect to a specific terminal device, such as the terminal device 120-2.

In step S220, upon receiving the measurement report from the terminal device, the serving AP device, such as the AP device 110-4, selects from the plurality of neighbor AP devices, such as the AP devices 110-1, 110-2 and 110-3, one or more candidate target access point devices based on the measurement report received from the terminal device, such as the terminal device 120-2.

According to one or more embodiments of the present disclosure, a neighbor AP device may be selected as a candidate target AP device if the neighbor AP device meets any one or more (in combination) of the following criteria:
- measured signal strength of the neighboring AP device is stronger than a first predetermined threshold;
- measured signal strength of said neighboring AP device is greater than that of the serving AP device with a second predetermined threshold;
- the neighboring AP device is with wired backhaul and its signal strength is greater than a third predetermined threshold. Specifically, the third predetermined threshold may be configured as a minimum acceptable threshold, because the neighboring AP device with wired backhaul could be preferred when selecting the candidate target AP device.

In the above discussed example, the serving AP device 110-4 may select the neighbor AP devices 110-1 and 110-2, for example because the AP device 110-1 has met one of the above criteria by utilizing wired backhaul and being capable of providing an acceptable signal strength and the AP device 110-2 has met two of the above criteria in combination by providing a signal strength greater both than the first predetermined threshold and than the signal strength of the serving AP device with the second predetermined threshold.

In step S230, the serving AP device, such the AP device 110-4, obtains evaluated capability levels from the selected one or more candidate target access point devices, such as the AP device 110-1, 110-2. Each of evaluated capability levels can be indicative of the capability of user experience to be provided by a respective candidate target access point device, such as the AP device 110-1, 110-2, for said terminal device, such as the terminal device 120-2.

Figure 3:
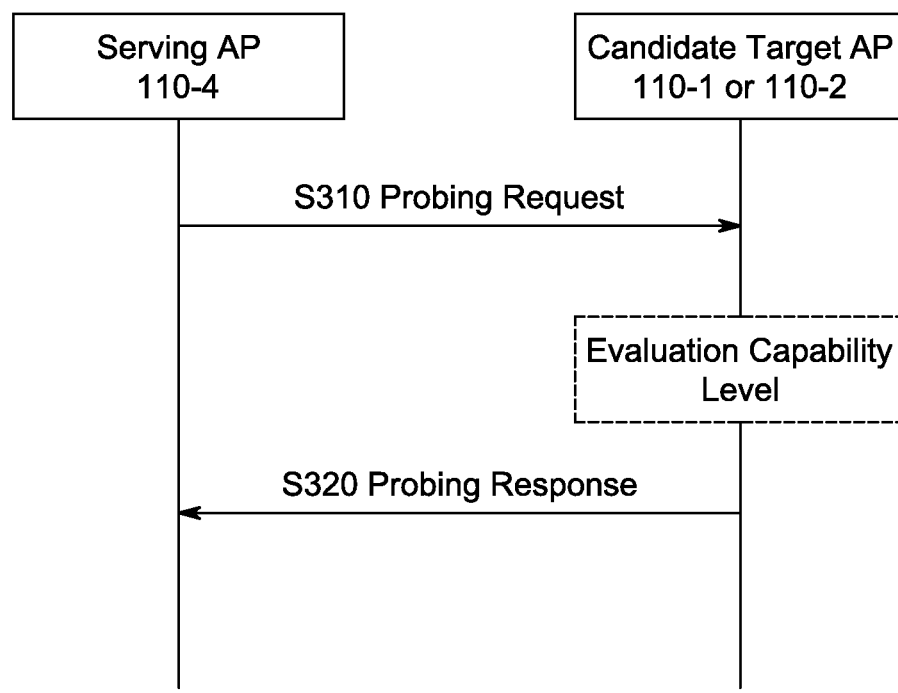
FIG. 3 schematically illustrates an exemplary signaling flow diagram between the serving access point device and one of the candidate target access point device according to one or more embodiments of the present disclosure.

According to one or more embodiments of the present disclosure, the serving AP device, such as the AP device 110-4, may obtain the capability levels of the candidate target AP devices, such as the AP device 110-1, 110-2, by performing a probing procedure as shown in FIG. 3.

FIG. 3 schematically illustrates an exemplary signaling flow diagram between the serving access point device and one of the candidate target access point device according to one or more embodiments of the present disclosure.

As shown in FIG. 3, in step S310, for each of the candidate target AP devices, such as each of the AP devices 110-1, 110-2, the serving AP device, such as the AP device 110-4, may send (310) a probing request. Within the probing request, the one or more measurement parameters for the respective candidate target AP device, such as the AP device 110-1 or 110-2 could be included so that the respective candidate target AP device could evaluate the capability of providing user experience for the terminal device, such as the terminal device 120-2. Here, the one or more measurement parameters for the respective candidate target AP device were previously received from the terminal device, such as the terminal device 120-2.

Upon receipt of the probing request, each of the candidate target AP devices, such as the AP device 110-1 or 110-2, may determine the capability of user experience to be provided for the terminal device, such as the terminal device 120-2, as a function of at least one user experience parameter evaluated by the candidate target access point device. In one or more impetrations, user experience parameter may include data rate, delay, packet loss rate, and etc. Some detailed examples for evaluation of the user experience parameters will be provided and discussed below with reference to FIG. 4, which shows an exemplary flow diagram performed by a candidate target AP device. The candidate target AP device then may produce a probing response including the evaluation results and send the same to the serving AP device.

In step S320, the serving AP device, such as the AP device 110-4, may receive the probing response from the candidate target access point device. The probing response contains an evaluated capability level indicative of the capability of user experience to be provided by the candidate target AP device, such as the AP device 110-1 or 110-2 for the terminal device, such as the terminal device 120-2.

Referring back to FIG. 2 again, in step S240, the serving AP device, such as the AP device 110-4, determines from the selected one or more candidate target AP devices, such as the AP devices 110-1, 110-2, a best candidate target AP device, for example the AP device 110-1, with the highest evaluated capability level as a target AP device. Referring to the above-discussed example, the AP device 110-1, which can provide a higher evaluated capability level than the AP device 110-2, can be identified as the best candidate target AP device and is determined as the target AP device.

The skilled person in the art may appreciate that according to the embodiment(s) described with reference to FIGS. 2 and 3, the serving AP device is allowed to obtain the information of evaluated capability levels from the candidate target AP devices that are selected based on the terminal device's measurement report. As a result, the capability of user experience to be provided by a respective candidate target AP device for the terminal device can be considered in selecting the target AP device to hand over.

In one embodiment of the present invention, based on the determination of the target AP device, a handover to the determined target AP device may be directly triggered by the serving AP device for the terminal device.

As an alternative embodiment, a decision on whether to hand over the terminal device from the serving AP device to the determined target AP device or not may be made by the serving AP device, such as the AP device 110-4. The evaluated capability level to be provided by the best candidate target AP device, such as the AP device 110-1, may be compared with the capability level provided by said serving AP device, such as the AP device 110-1. If the evaluated capability level to be provided by said target AP device is greater than the capability level provided by said serving AP device preferably by a fourth predetermined threshold, the serving AP device, such as the AP device 110-4, may trigger a handover for the terminal device, such as the terminal device 120-2, from its serving node to the determined best candidate target AP device, i.e., the target AP device 110-1. Otherwise, the serving AP device, such as the AP device 110-4, may not trigger a handover for the terminal device, such as the terminal device 120-2. That means, the serving AP device 110-4 may remain unchanged for the terminal device 120-2.

FIG. 4 schematically illustrates an exemplary flow diagram of the method 400 for operating a neighbor AP device according to one or more embodiments of the present disclosure.

As shown in FIG. 4, in step S410, each of the candidate target AP devices selected from the neighbor AP devices for the terminal device can provide the serving AP device of the terminal device with an evaluated capability level indicative of the capability of user experience to be provided for the terminal device.

According to one or more embodiments of the present disclosure, each candidate target AP device, such as the AP device 110-1 or 110-2 may receive, from the serving access point device, such as the AP device 110-4, a probing request containing one or more measurement parameters for the respective access point device 110-1 or 110-2. Such measurement parameters were measured and reported by the terminal device, such as the terminal device 120-2 for the respective AP device 110-1 or 110-2.

The respective candidate target AP device 110-1 or 110-2 may evaluate its evaluated capability level based on the one or more measurement parameters and its local information, for example, time-frequency resource available for being allocated for the terminal device 120-2, backhaul capacity available being allocated for the terminal device 120-2, processing capacity available being allocated for the terminal device 120-2, etc.

The evaluated capability level of the capability of user experience to be provided by the candidate target AP device 110-1 or 110-2 for the terminal device 120-2 may determined as a function of at least one user experience parameter evaluated by the respective candidate target AP device. Several different user experience parameters may be used to characterize the capability level, in a form of, for example, a weighted value. The user experience parameters may include data rate, delay, packet loss rate, etc. In a non-limiting implementation, the parameters of data rate, delay, packet loss rate may be evaluated for example according to following equations:

$$DataRate = \text{function (available time-frequency resource, SINR, Backhaul capacity)} \quad 1)$$

where available time-frequency resource and Backhaul capacity can be determined by the respective candidate target AP device locally; SINR can be determined from the measurement parameters reported by the terminal device.

$$Delay = \text{Delay in access link} + \text{Delay in backhaul link} \quad 2)$$

where Delay in backhaul link can be determined by the respective candidate target AP device locally; Delay in access link can be estimated or calculated from the combination of measurement parameters reported by the terminal device and the local information.

$$PacketLossRate = (\text{dropped packets})/(\text{total packets transmitted}) \quad 3)$$

and $$\text{dropped packets} = \text{function (available time-frequency-resource, SINR, backhaul capacity)}$$

where available time-frequency resource and Backhaul capacity can be determined by the respective candidate target AP device locally; SINR can be determined from the measurement parameters reported by the terminal device.

The delay of a wireless backhaul link may be estimated roughly based on the number of hops multiplied by a typical delay of each hop.

After the evaluation of the capability level, the respective candidate target AP device 110-1 or 110-2 may send, to the serving AP device 110-4, its probing response containing the evaluated capability level to be provided for the terminal device 120.

It should be noted that the above depiction is only exemplary, not intended for limiting the present disclosure. In other embodiments of the present disclosure, this method may have more, or less, or different steps, and the steps numbering is only for making the depiction more concise and clearer, but not for stringently limiting the sequence between each steps; while the sequence of steps may be different from the depiction. For example, in some embodiments, the above one or more optional steps may be omitted. Specific embodiment of each step may be different from the depiction. All these variations fall within the spirit and scope of the present disclosure.

Figure 5:
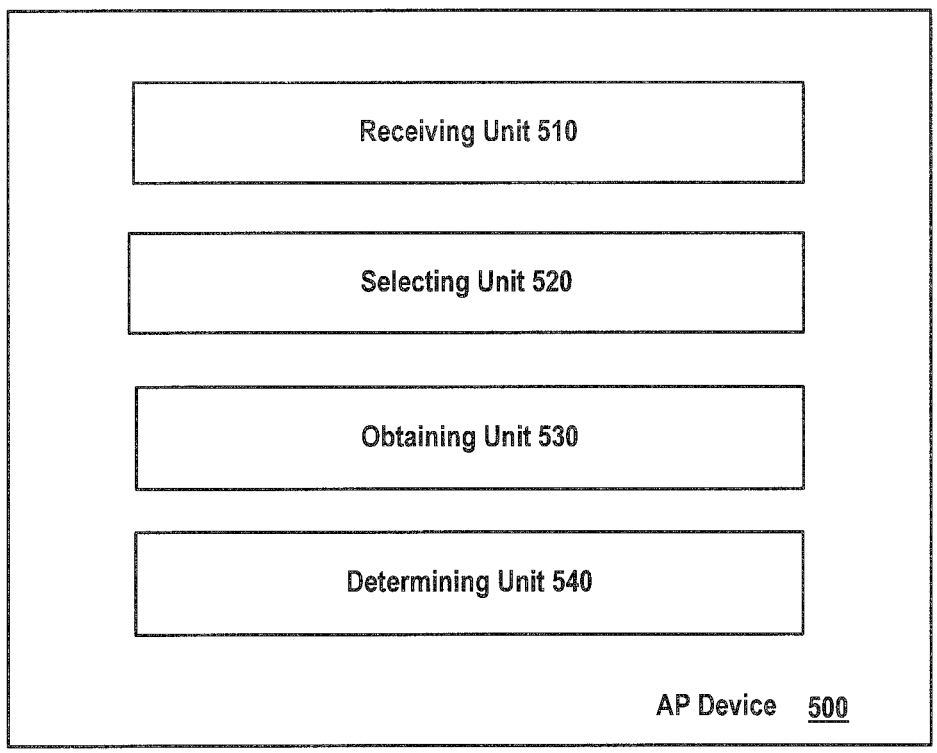
FIG. 5 schematically illustrates a block diagram of an access point device according to one or more embodiments of the present disclosure.

FIG. 5 schematically illustrates a block diagram of an AP device according to one or more embodiments of the present disclosure.

It is assumed that the AP device 500 is currently connected with a terminal device and serving as the serving AP device of the terminal device. As shown in FIG. 5, the AP device 500 comprises a receiving unit 510, a selecting unit 520, an obtaining unit 530 and a determining unit 540. Although the blocks representing those functional units are illustrated separately, the person skilled in the art may appreciate that the functional units may be or may not be implemented in individual logical/functional entities. Some blocks may be or may not be divided from/merged into those blocks according to detailed different implementations, which all fall within the scope of the present disclosure.

The receiving unit 510 is configured to receive from the terminal device a measurement report including one or more measurement parameters for a plurality of neighbor AP devices and the AP device 500. According to one or more embodiments of the present disclosure, the one or more measurement parameters included in the measurement report may comprise at least one parameter indicating signal strength received from a neighbor AP device of the plurality of neighbor AP devices; and at least one parameter indicating the identification of the neighbor AP device.

Based on the measurement report received by the receiving unit 510, the selecting unit 520 is configured to select, from the plurality of neighbor AP devices, one or more candidate target AP devices. According to one or more embodiments of the present disclosure, the selecting unit 520 may be configured to select a neighbor AP device as a candidate target AP device if the neighbor AP device meets one or more of the following criteria:

signal strength of the neighboring AP device is stronger than a first predetermined threshold;

signal strength of the neighboring AP device is greater than that of the serving AP device with a second predetermined threshold;

the neighboring AP device is with wired backhaul and its signal strength is greater than a third predetermined threshold.

The obtaining unit 530 is configured to obtain evaluated capability levels from the selected one or more candidate target AP devices. Each of evaluated capability levels is indicative of the capability of user experience to be provided by a respective candidate target AP device for the terminal device. According to one or more embodiments of the present disclosure, for each of the one or more candidate target AP devices, the obtaining unit 530 may be configured to send to the candidate target AP device a probing request which contains one or more measurement parameters for the candidate target AP device, which were reported by the terminal device. Then, the obtaining unit 530 may receive from the candidate target AP device a probing response, which contains an evaluated capability level indicative of the capability of user experience to be provided for the terminal device. According to one or more embodiments of the present disclosure, the evaluated capability level may be determined as a function of at least one user experience parameter evaluated by the candidate target AP device. For example, the at least one user experience parameter may include data rate, delay, packet loss rate.

The determining unit 540 is configured to determine from the selected one or more candidate target AP devices a best candidate target AP device with the highest evaluated capability level as a target AP device.

According to one embodiment of the present disclosure, the determining unit 540 or a further determining unit may be configured to make a decision to hand over the terminal device from the AP device 500 to the determined target AP device.

As an alternative embodiment, the determining unit 540 or a further determining unit may be configured to determine whether to hand over the terminal device from the serving AP device to the target AP device or not by comparing the evaluated capability level to be provided by the best candidate target AP device with the capability level provided by the serving AP device. A handover for the terminal device from the serving node to the best candidate target AP device may be triggered by the determining unit 540 or the further determining unit, if the highest evaluated capability level to be provided by the best candidate target AP device is greater than the capability level provided by the serving AP device by a fourth predetermined threshold.

Figure 6:
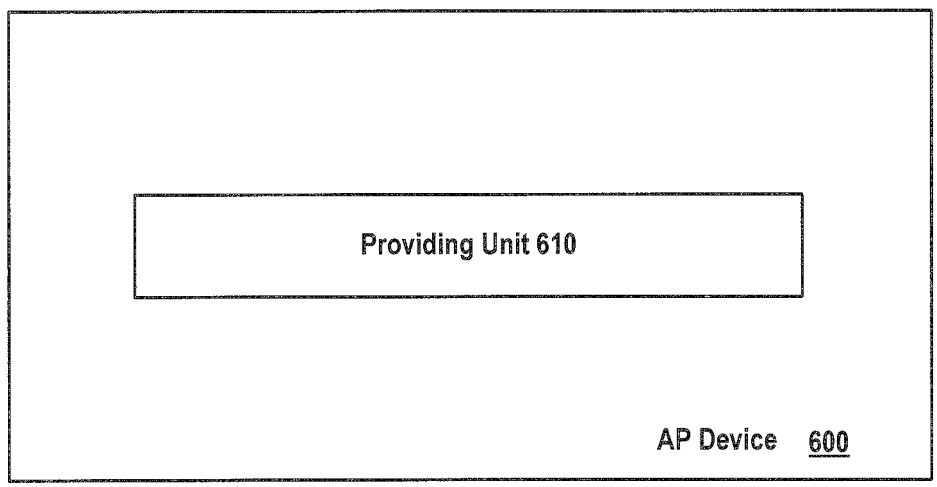
FIG. 6 schematically illustrates a block diagram of an access point device according to one or more embodiments of the present disclosure.

FIG. 6 schematically illustrates a block diagram of an AP device according to one or more embodiments of the present disclosure.

It is assumed that the AP device 600 is neighboring to a serving AP device of a terminal device. As shown in FIG. 6, the AP device 600 comprises a providing unit 610. The person skilled in the art may appreciate that that functional unit may be or may not be implemented in an individual logical/functional entity. Some blocks may be or may not be divided from/merged into the block according to detailed different implementations, which all fall within the scope of the present disclosure.

The providing unit 610 is configured to provide the serving AP device with an evaluated capability level indicative of the capability of user experience to be provided for the terminal device.

According to one or more embodiments of the present disclosure, the providing unit 610 may be configured to receive from the serving AP device a probing request which contains one or more measurement parameters for the AP device. The one or more measurement parameters for the AP device were reported to the serving AP device by the terminal device. The providing unit 610 may evaluate the evaluated capability level based on the one or more measurement parameters and local information of the AP device 600. According to one or more embodiments of the present disclosure, the evaluated capability level may be determined as a function of at least one user experience parameter evaluated by the candidate target AP device. The providing unit 610 then may be configured to send to the serving AP device a probing response, which contains the evaluated capability level to be provided for the terminal device.

Figure 7:
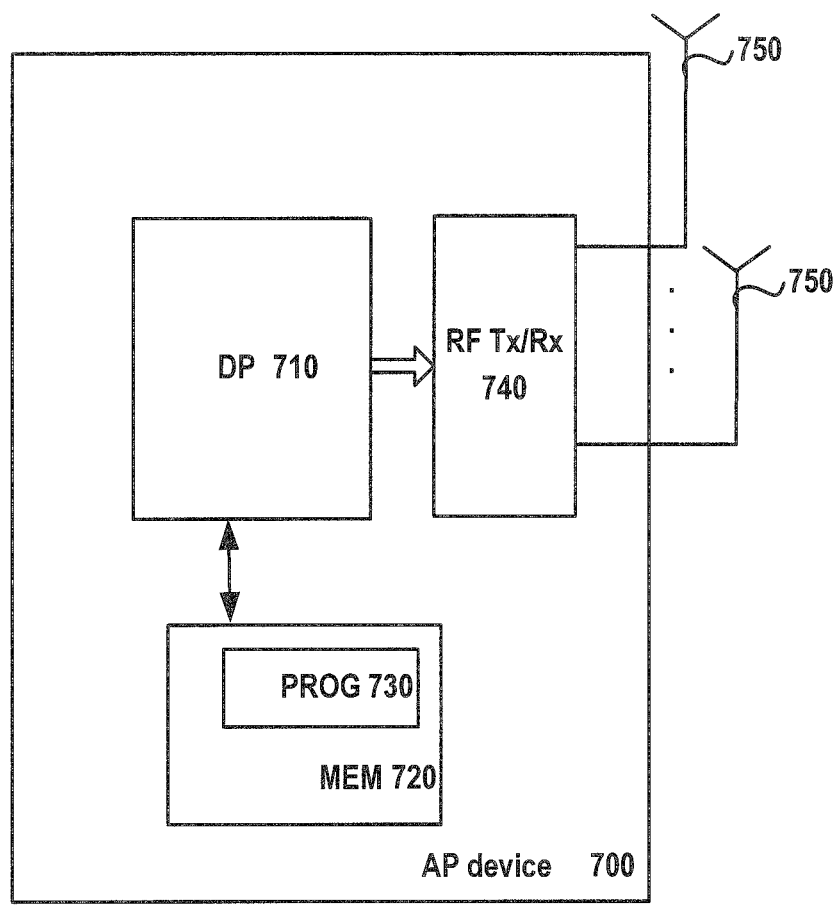
FIG. 7 schematically illustrates a block diagram of an access point device according to one or more embodiments of the present disclosure.

FIG. 7 schematically shows a simplified block diagram of an AP device according to an embodiment of the present disclosure.

The AP device 700 is adapted for communication with one or more terminal devices in the radio communication system. As discussed previously, the AP device 700 can operate in a UDN network, as illustrated in FIG. 1.

The AP device 700 includes a data processor (DP) 710, a memory (MEM) 720 coupled to/embedded in the DP 710, and suitable RF transmitter TX/receiver RX module 740 coupling antenna array 750 to the DP 710. The RF TX/RX module 740 is for bidirectional wireless communications with at least one terminal device. The MEM 720 stores a program (PROG) 730.

When the AP device 700 is operating as a serving AP device for a terminal device, the PROG 730 is assumed to include program instructions that, when executed by the DP 710, enable the AP device 700 to operate in accordance with the exemplary embodiments of this disclosure, as discussed herein with the flow diagram as shown in FIGS. 2 and 3. When the AP device 700 is operating as a neighbor AP device for a terminal device, the PROG 730 is assumed to include program instructions that, when executed by the DP 710, enable the AP device 700 to operate in accordance with the exemplary embodiments of this disclosure, as discussed herein with the flow diagram as shown in FIGS. 4 and 3.

The MEM 720 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the AP device 700, there may be several physically distinct memory units in the AP device 700.

The DP 710 performs any required computations or decisions, which may be involved in the communication procedures as described with reference to FIG. 2, FIG. 3 and/or FIG. 4. The DP 710 may be of any type suitable to the local technical environment, and may include one or more of general purpose computers, special purpose computers, microprocessors, DSPs and processors based on multi-core processor architecture, as non-limiting examples.

Embodiment 1: a method for operating an access point device in a radio communication system, the access point device being currently connected with a terminal device and serving as the serving access point device, the method comprises:

receiving from said terminal device a measurement report including one or more measurement parameters for a plurality of neighbor access point devices and said serving access point device;

selecting from said plurality of neighbor access point devices one or more candidate target access point devices based on said measurement report received from said terminal device;

obtaining evaluated capability levels from the selected one or more candidate target access point devices, each of evaluated capability levels being indicative of the capability of user experience to be provided by a respective candidate target access point device for said terminal device; and determining from the selected one or more candidate target access point devices a best candidate target access point device with the highest evaluated capability level as a target access point device.

Embodiment 2: according to Embodiment 1, said one or more measurement parameters included in said measurement report comprise:

at least one parameter indicating signal strength received from a neighbor access point device of said plurality of neighbor access point devices; and at least one parameter indicating the identification of the neighbor access point device.

Embodiment 3: according to Embodiment 2, the step of selecting further comprises: selecting a neighbor access point device as a candidate target access point device if said neighbor access point device meets one or more of the following criteria:

signal strength of said neighboring access point device is stronger than a first predetermined threshold;

signal strength of said neighboring access point device is greater than that of said serving access point device with a second predetermined threshold;

said neighboring access point device is with wired backhaul and its signal strength is greater than a third predetermined threshold.

Embodiment 4: according to Embodiment 2, the step of obtaining comprises:

for each of said one or more candidate target access point devices sending to the candidate target access point device a probing request containing one or more measurement parameters for said candidate target access point device, wherein said one or more measurement parameters for said candidate target access point device were reported by said terminal device;

receiving a probing response from the candidate target access point device, wherein said probing response contains an evaluated capability level indicative of the capability of user experience to be provided for said terminal device.

Embodiment 5: according to any of Embodiments 1 and 4, said evaluated capability level of the capability of user experience to be provided for said terminal device is determined as a function of at least one user experience parameter evaluated by said candidate target access point device.

Embodiment 6: according to Embodiment 5, said at least one user experience parameter includes data rate, delay, packet loss rate.

Embodiment 7: according to Embodiment 1, the method further comprises:

directly triggering a handover for said terminal device from said serving node to said best candidate target access point device, or determining whether to hand over said terminal device from said serving access point device to said target access point device by comparing the evaluated capability level to be provided by said best candidate target access point device with the capability level provided by said serving access point device; and triggering a handover for said terminal device from said serving node to said best candidate target access point device, if the evaluated capability level to be provided by said target access point device is greater than the capability level provided by said serving access point device by a fourth predetermined threshold.

Embodiment 8: a method for operating an access point device in a radio communication system, said access point device being neighboring to a serving access point device of a terminal device, the method comprises:

providing said serving access point device with an evaluated capability level indicative of the capability of user experience to be provided for said terminal device.

Embodiment 9: according to Embodiment 8, the step of providing comprises:

receiving from said serving access point device a probing request containing one or more measurement parameters for said access point device, wherein said one or more measurement parameters for said access point device were reported to said serving access point device by said terminal device;

evaluating said evaluated capability level based on said one or more measurement parameters and local information of said access point device; and sending to said serving access point device a probing response containing said evaluated capability level to be provided for said terminal device.

Embodiment 10: according to Embodiment 9, said evaluated capability level of the capability of user experience to be provided for said terminal device is determined as a function of at least one user experience parameter evaluated by said candidate target access point device.

Embodiment 11: an access point device in a radio communication system comprises:

a receiving unit configured to receive from a terminal device a measurement report including one or more measurement parameters for a plurality of neighbor access point devices and said access point device, wherein said access point device is currently connected with said terminal device and serving as the serving access point device of said terminal device;

a selecting unit configured to select from said plurality of neighbor access point devices one or more candidate target access point devices based on said measurement report received from said terminal device;

an obtaining unit configured to obtain evaluated capability levels from the selected one or more candidate target access point devices, each of evaluated capability levels being indicative of the capability of user experience to be provided by a respective candidate target access point device for said terminal device; and a determining unit configured to determine from the selected one or more candidate target access point devices a best candidate target access point device with the highest evaluated capability level as a target access point device.

Embodiment 12: according to Embodiment 11, said one or more measurement parameters included in said measurement report comprise:

at least one parameter indicating signal strength received from a neighbor access point device of said plurality of neighbor access point devices; and at least one parameter indicating the identification of the neighbor access point device.

Embodiment 13: according to Embodiment 12, said selecting unit is configured to select a neighbor access point device as a candidate target access point device if said neighbor access point device meets one or more of the following criteria:

signal strength of said neighboring access point device is stronger than a first predetermined threshold;

signal strength of said neighboring access point device is greater than that of said serving access point device with a second predetermined threshold;

said neighboring access point device is with wired backhaul and its signal strength is greater than a third predetermined threshold.

Embodiment 14: according to Embodiment 12, said obtaining unit is configured to:

for each of said one or more candidate target access point devices send to the candidate target access point device a probing request containing one or more measurement parameters for said candidate target access point device, wherein said one or more measurement parameters for said candidate target access point device were reported by said terminal device;

receive a probing response from the candidate target access point device, wherein said probing response contains an evaluated capability level indicative of the capability of user experience to be provided for said terminal device.

Embodiment 15: according to Embodiment 11 or 14, said evaluated capability level of the capability of user experience to be provided for said terminal device is determined as a function of at least one user experience parameter evaluated by said candidate target access point device.

Embodiment 16: according to Embodiment 15, said at least one user experience parameter includes data rate, delay, packet loss rate.

Embodiment 17: according to Embodiment 11, the access point device further comprises a further determining unit configured to:

directly trigger a handover for said terminal device from said serving node to said best candidate target access point device, or determine whether to hand over said terminal device from said serving access point device to said target access point device by comparing the evaluated capability level to be provided by said best candidate target access point device with the capability level provided by said serving access point device; and trigger a handover for said terminal device from said serving node to said best candidate target access point device, if the highest evaluated capability level to be provided by said best candidate target access point device is greater than the capability level provided by said serving access point device by a fourth predetermined threshold.

Embodiment 18: an access point device in a radio communication system, said access point device being neighboring to a serving access point device of a terminal device, said access device comprises:

a providing unit configured to provide said serving access point device with an evaluated capability level indicative of the capability of user experience to be provided for said terminal device.

Embodiment 19: according to Embodiment 18, said providing unit is configured to:

receive from said serving access point device a probing request containing one or more measurement parameters for said access point device, wherein said one or more measurement parameters for said access point device were reported to said serving access point device by said terminal device;

evaluate said evaluated capability level based on said one or more measurement parameters and local information of said access point device; and send to said serving access point device a probing response containing said evaluated capability level to be provided for said terminal device.

Embodiment 20: according to Embodiment 19, said evaluated capability level of the capability of user experience to be provided for said terminal device is determined as a function of at least one user experience parameter evaluated by said candidate target access point device.

Embodiment 21: an apparatus for operating an access point device in a radio communication system, said access point device being currently connected with a terminal device and serving as the serving access point device, said apparatus comprises:

means for receiving from said terminal device a measurement report including one or more measurement parameters for a plurality of neighbor access point devices and said serving access point device;

means for selecting from said plurality of neighbor access point devices one or more candidate target access point devices based on said measurement report received from said terminal device;

means for obtaining evaluated capability levels from the selected one or more candidate target access point devices, each of evaluated capability levels being indicative of the capability of user experience to be provided by a respective candidate target access point device for said terminal device; and means for determining from the selected one or more candidate target access point devices a best candidate target access point device with the highest evaluated capability level as a target access point device.

Embodiment 22: an apparatus for operating an access point device in a radio communication system, said access point device being neighboring to a serving access point device of a terminal device, the apparatus comprises:

means for providing said serving access point device with an evaluated capability level indicative of the capability of user experience to be provided for said terminal device.

Embodiment 23: an access point device comprises one or more processors; and one or more memories including computer program code, the one or more memories and the computer program code configured to, with the one or more processors, cause the access point device to perform:

receiving from a terminal device a measurement report including one or more measurement parameters for a plurality of neighbor access point devices and said access point device, wherein said access point device is currently connected with said terminal device and serving as the serving access point device of said terminal device;

selecting from said plurality of neighbor access point devices one or more candidate target access point devices based on said measurement report received from said terminal device;

obtaining evaluated capability levels from the selected one or more candidate target access point devices, each of evaluated capability levels being indicative of the capability of user experience to be provided by a respective candidate target access point device for said terminal device; and determining from the selected one or more candidate target access point devices a best candidate target access point device with the highest evaluated capability level as a target access point device.

Embodiment 24: an access point device comprises one or more processors; and one or more memories including computer program code, the one or more memories and the computer program code configured to, with the one or more processors, cause the access point device to perform:

providing said serving access point device with an evaluated capability level indicative of the capability of user experience to be provided for said terminal device, wherein said access point device is neighboring to said serving access point device of a terminal device.

Embodiment 25: an access point device comprises: processing means adapted to:

receive from a terminal device a measurement report including one or more measurement parameters for a plurality of neighbor access point devices and said access point device, wherein said access point device is currently connected with said terminal device and serving as the serving access point device of said terminal device;

select from said plurality of neighbor access point devices one or more candidate target access point devices based on said measurement report received from said terminal device;

obtain evaluated capability levels from the selected one or more candidate target access point devices, each of evaluated capability levels being indicative of the capability of user experience to be provided by a respective candidate target access point device for said terminal device; and determine whether to hand over said terminal device from said serving access point device to one of said candidate target access point devices based on said evaluated capability levels obtained from said one or more candidate target access point devices.

Embodiment 26: an access point device comprises: processing means adapted to:

provide said serving access point device with an evaluated capability level indicative of the capability of user experience to be provided for said terminal device, wherein said access point device is neighboring to said serving access point device of a terminal device.

Embodiment 27: according to Embodiment 25 or 26, the processing means comprise a processor and a memory and wherein said memory is containing instructions executable by said processor.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosures may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system.

The present disclosure has been specifically illustrated and explained with reference to the preferred embodiments. The skilled in the art should understand various changes thereto in form and details may be made without departing from the spirit and scope of the present disclosure.

What is claimed is:

1. A method for operating an access point device in a radio communication system, said access point device being currently connected with a terminal device and serving as a serving access point device of the terminal device, the method comprising:

receiving, from said terminal device, a measurement report including one or more measurement parameters for a plurality of neighbor access point devices and said serving access point device, wherein said measurement report:
  indicates signal strength for each of said plurality of neighbor access point devices; and
  indicates which neighbor access point device of said plurality of neighbor access point devices has wired backhaul;

selecting, from said plurality of neighbor access point devices, one or more candidate target access point devices based on said measurement report received from said terminal device; obtaining evaluated capability levels from the selected one or more candidate target access point devices in response to a probing request sent by said serving access point device, each of said evaluated capability levels being indicative of a capability of user experience to be provided by a respective candidate target access point device for said terminal device, wherein each of said evaluated capability levels is based on local information and said one or more measurement parameters of said respective candidate target access point device, said local information including an available backhaul capacity allocated for said terminal device; determining, from the selected one or more candidate target access point devices, a best candidate target access point device with the highest evaluated capability level as a target access point device;

determining whether to handover said terminal device from said serving access point device to said best candidate target access point device by comparing the evaluated capability level to be provided by said best candidate target access point device with a capability level provided by said serving access point device; and triggering a handover for said terminal device from said serving access point device to said best candidate target access point device, if the evaluated capability level to be provided by said best candidate target access point device is greater than the capability level provided by said serving access point device by a fourth predetermined threshold.

2. The method according to claim 1, wherein said one or more measurement parameters included in said measurement report comprise:
  at least one parameter indicating signal strength received from a neighbor access point device of said plurality of neighbor access point devices; and
  at least one parameter indicating an identification of the neighbor access point device.

3. The method according to claim 1, wherein selecting, from said plurality of neighbor access point devices, said one or more candidate target access point devices based on said measurement report received from said terminal device further comprises:
  selecting a neighbor access point device as a candidate target access point device if said neighbor access point device meets one or more of the following criteria:
    signal strength of said neighbor access point device is stronger than a first predetermined threshold;
    signal strength of said neighbor access point device is greater than that of said serving access point device with a second predetermined threshold; and
    said neighbor access point device is with wired backhaul and signal strength of said neighbor access point device is greater than a third predetermined threshold.

4. The method according to claim 1, wherein obtaining the evaluated capability levels indicative of the capability of user experience to be provided for said terminal device from the selected one or more candidate target access point devices comprises:
  for each of said one or more candidate target access point devices:
    sending, to said respective candidate target access point device, the probing request containing said one or more measurement parameters for said respective candidate target access point device, wherein said one or more measurement parameters for said respective candidate target access point device were reported by said terminal device; and
    receiving a probing response from said respective candidate target access point device, wherein said probing response contains said evaluated capability level indicative of the capability of user experience to be provided for said terminal device.

5. The method according to claim 1, wherein said evaluated capability level of the capability of user experience to be provided for said terminal device is determined as a function of at least one user experience parameter evaluated by said candidate target access point device.

6. The method according to claim 5, wherein said at least one user experience parameter includes data rate, delay, and packet loss rate.

7. An access point device in a radio communication system, the access point device comprising:
  a receiver configured to receive, from a terminal device, a measurement report including one or more measurement parameters for a plurality of neighbor access point devices and said access point device, wherein said access point device is currently connected with said terminal device and serving as a serving access point device of said terminal device, and wherein said measurement report:
    indicates signal strength for each of said plurality of neighbor access point devices; and
    indicates which neighbor access point device of said plurality of neighbor access point devices has wired backhaul; and
  a processor configured to:
    select, from said plurality of neighbor access point devices, one or more candidate target access point devices based on said measurement report received from said terminal device;
    obtain evaluated capability levels from the selected one or more candidate target access point devices in response to a probing request sent by said serving access point device, each of said evaluated capability levels being indicative of a capability of user experience to be provided by a respective candidate target access point device for said terminal device, wherein each of said evaluated capability levels is based on local information and said one or more measurement parameters of said respective candidate target access point device, said local information including an available backhaul capacity allocated for said terminal device;
    determine, from the selected one or more candidate target access point devices, a best candidate target access point device with the highest evaluated capability level as a target access point device;
    determine whether to handover said terminal device from said serving access point device to said best candidate target access point device by comparing the evaluated capability level to be provided by said best candidate target access point device with a capability level provided by said serving access point device; and
    trigger a handover for said terminal device from said serving access point device to said best candidate target access point device, if the evaluated capability level to be provided by said best candidate target access point device is greater than the capability level provided by said serving access point device by a fourth predetermined threshold.

8. The access point device according to claim 7, wherein said one or more measurement parameters included in said measurement report comprise:
  at least one parameter indicating signal strength received from a neighbor access point device of said plurality of neighbor access point devices; and
  at least one parameter indicating an identification of the neighbor access point device.

9. The access point device according to claim 7, wherein the processor is configured to select, from said plurality of neighbor access point devices, a neighbor access point device as a candidate target access point device if said neighbor access point device meets one or more of the following criteria:
  signal strength of said neighbor access point device is stronger than a first predetermined threshold;
  signal strength of said neighbor access point device is greater than that of said serving access point device with a second predetermined threshold; and
  said neighbor access point device is with wired backhaul and signal strength of said neighbor access point device is greater than a third predetermined threshold.

10. The access point device according to claim 7, wherein, for each of said one or more candidate target access point devices, the processor is configured to:
  send, to the respective candidate target access point device, the probing request containing said one or more measurement parameters for said respective candidate target access point device, wherein said one or more measurement parameters for said respective candidate target access point device were reported by said terminal device; and receive a probing response from the respective candidate target access point device, wherein said probing response contains said evaluated capability level indicative of the capability of user experience to be provided for said terminal device.

11. The access point device according to claim 7, wherein said evaluated capability level of the capability of user experience to be provided for said terminal device is determined as a function of at least one user experience parameter evaluated by said candidate target access point device.

12. The access point device according to claim 11, wherein said at least one user experience parameter includes data rate, delay, and packet loss rate.

\* \* \* \* \*